United States Patent
Avila Macias

(10) Patent No.: US 10,085,456 B2
(45) Date of Patent: Oct. 2, 2018

(54) DEVICE FOR CUTTING SLICES OF A FOOD PRODUCT

(71) Applicant: Miguel Angel Avila Macias, Zapopan (MX)

(72) Inventor: Miguel Angel Avila Macias, Zapopan (MX)

( * ) Notice: Subject to any disclaimer, the term of this patent is extended or adjusted under 35 U.S.C. 154(b) by 564 days.

(21) Appl. No.: 14/468,697

(22) Filed: Aug. 26, 2014

(65) Prior Publication Data

US 2016/0021892 A1    Jan. 28, 2016

(30) Foreign Application Priority Data

Jul. 25, 2014   (MX) .................. MX/A/2014/009109

(51) Int. Cl.
*A21C 15/04* (2006.01)
*B26D 3/24* (2006.01)

(52) U.S. Cl.
CPC ................ *A21C 15/04* (2013.01); *B26D 3/24* (2013.01); *B26D 3/245* (2013.01)

(58) Field of Classification Search
CPC .......... B26D 3/245; B26D 3/24; A21C 15/04; B26B 3/04
USPC .................................. 30/114, 320, 298, 321
See application file for complete search history.

(56) References Cited

U.S. PATENT DOCUMENTS

| | | | |
|---|---|---|---|
| 1,603,941 A | 10/1926 | Edwards | |
| 2,085,372 A | 6/1937 | Lenk | |
| 2,600,646 A | 6/1952 | Haugland | |
| 2,679,687 A * | 6/1954 | Ledbetter | B26B 3/04 294/7 |
| 2,841,868 A * | 7/1958 | O'Brien | B26B 3/04 30/114 |
| 3,888,001 A * | 6/1975 | Gilbart-Smith | B26D 3/245 30/114 |
| 4,411,066 A * | 10/1983 | Allahverdian | B26D 3/245 30/114 |
| 4,553,325 A | 11/1985 | Allahverdian | |
| 4,592,139 A | 6/1986 | Huang | |

(Continued)

FOREIGN PATENT DOCUMENTS

| | | |
|---|---|---|
| CN | 202311039 | 7/2012 |
| HU | 0303233 A2 | 12/2005 |
| TW | M411117 | 9/2011 |

OTHER PUBLICATIONS

Grab Cool Cook, The Coolest Products on Earth website; 2013-2015; http://grabcoolcook.com/?s=Cheesecake+cutter; Printout from the internet; Published in: US.

(Continued)

*Primary Examiner* — Andrea Wellington
*Assistant Examiner* — Samuel A Davies
(74) *Attorney, Agent, or Firm* — Dennis D. Brown; Brown Patent Law, P.L.L.C.

(57) ABSTRACT

A device for cutting a food product such as a cake, tart, gelatin, pie or the like having a preferably circular form, but not necessarily, the device comprising a cutting structure formed by blades in the shape of the slice or piece to be cut; a grip or handle to hold and manipulate the device and a system for defining the size of the slice and also for controlling the holding and releasing of a freshly cut slice. The device further allows the user to choose the amount of slices into which the cake is to be split and displays the number of slices selected.

10 Claims, 14 Drawing Sheets

(56) References Cited

U.S. PATENT DOCUMENTS

| | | | | |
|---|---|---|---|---|
| D286,608 S | * | 11/1986 | Leung | D7/644 |
| 4,847,998 A | | 7/1989 | Colozzi et al. | |
| D381,244 S | | 7/1997 | Laib | |
| D420,259 S | * | 2/2000 | Laib | D7/673 |
| 7,913,396 B2 | | 3/2011 | Wei | |
| 2009/0193660 A1 | * | 8/2009 | Chen | A21C 15/04 30/114 |

OTHER PUBLICATIONS

ALIExpress; 2010-2015; http://www.aliexpress.com/wholesale?SearchText=Adjustable+cake+cutter&catId—0&initiative_id=SB_20150317060502; Printout from the internet; Published in: China.
dhgate.com, http://www.dhgate.com/product/china-post-air-5pcs-adjustable-cake-cutter/128997849.html; 2004-2015; Printout from the internet; Published in: China.
Hudra Otto; Cake Slicer and Distributor; Bibliographic Data: HU0303233 A2; Application No. HU20030003233 20031003; Abstract not available; Espacenet; Dec. 28, 2005; Published in: Unknown.

* cited by examiner

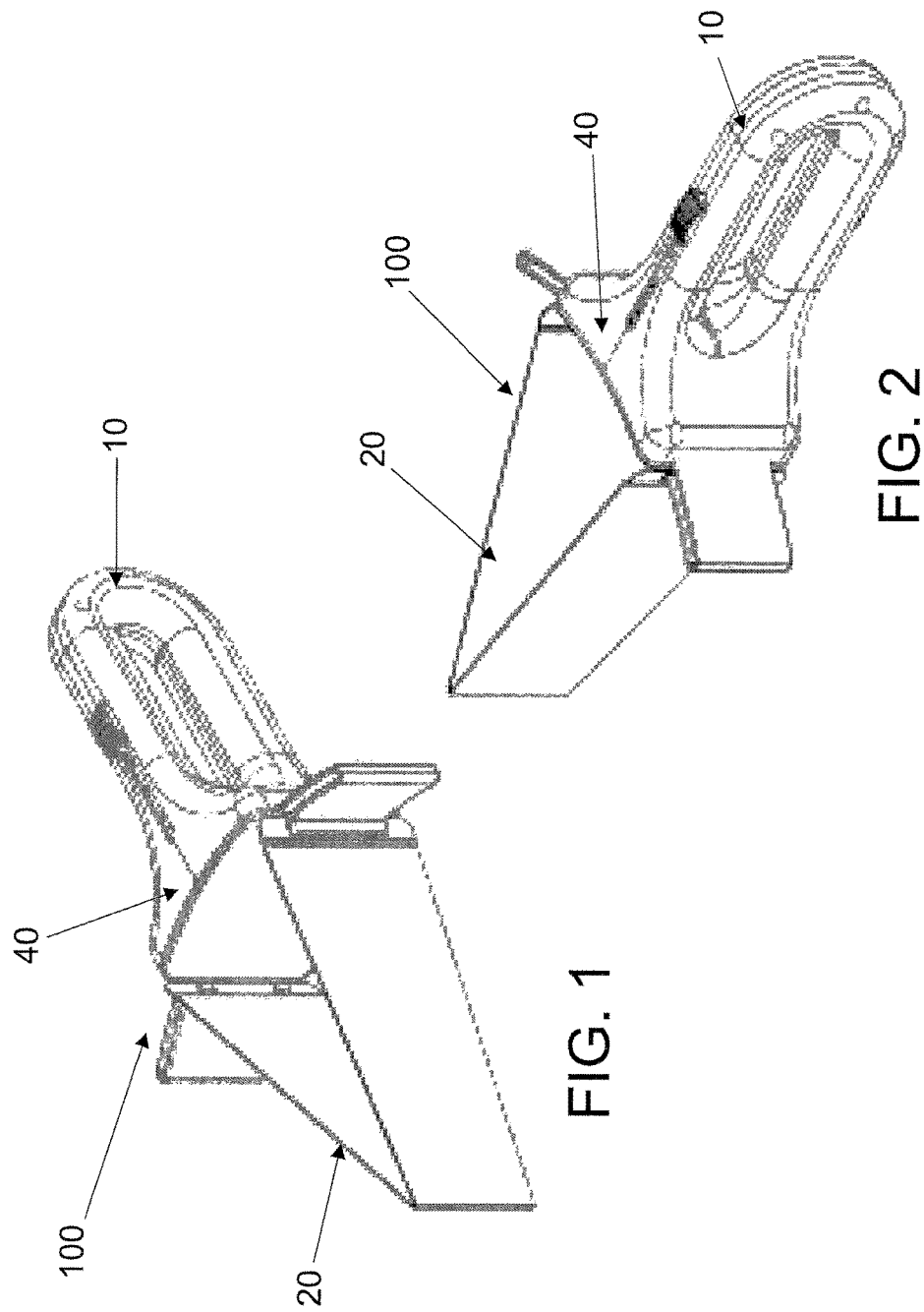

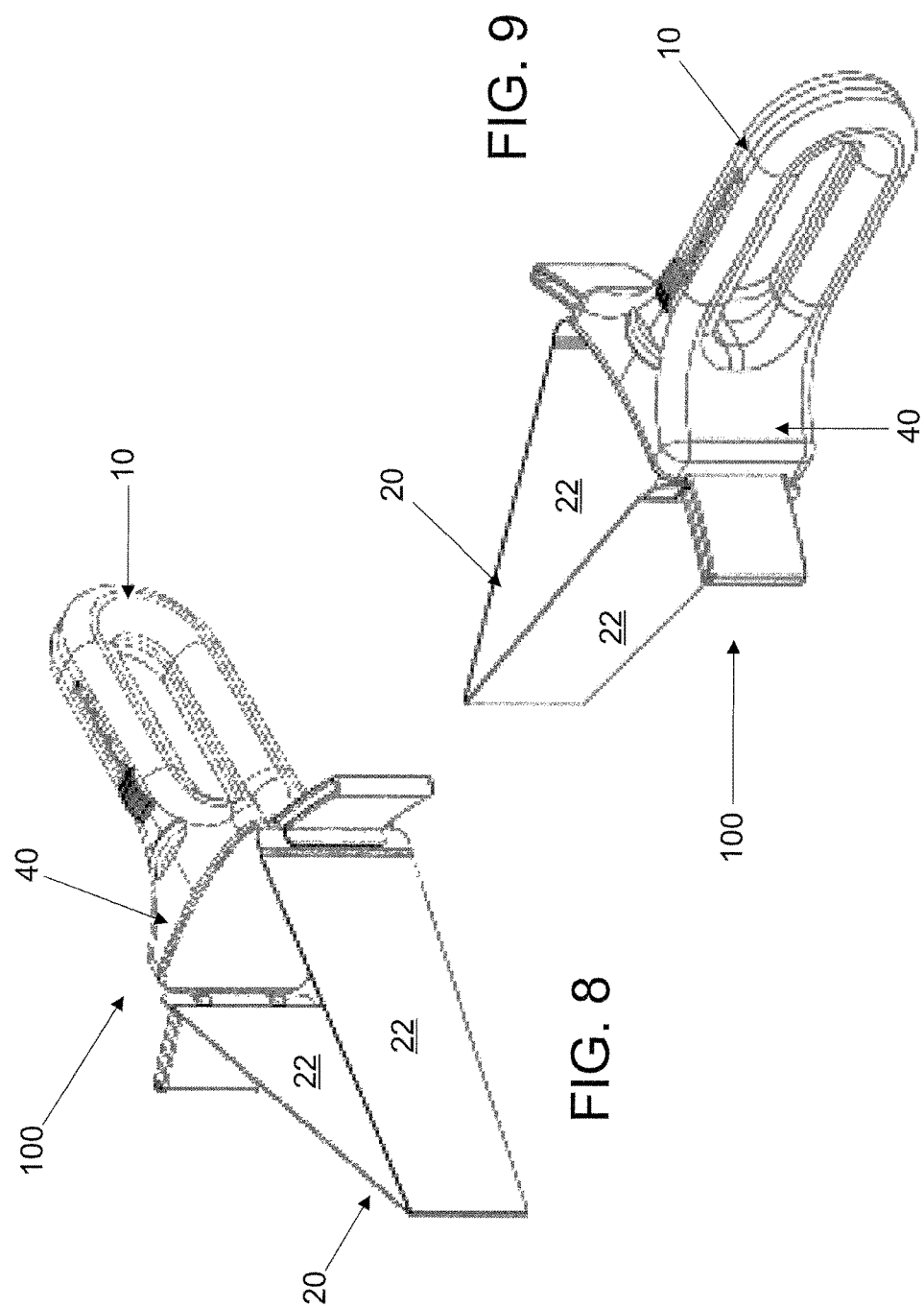

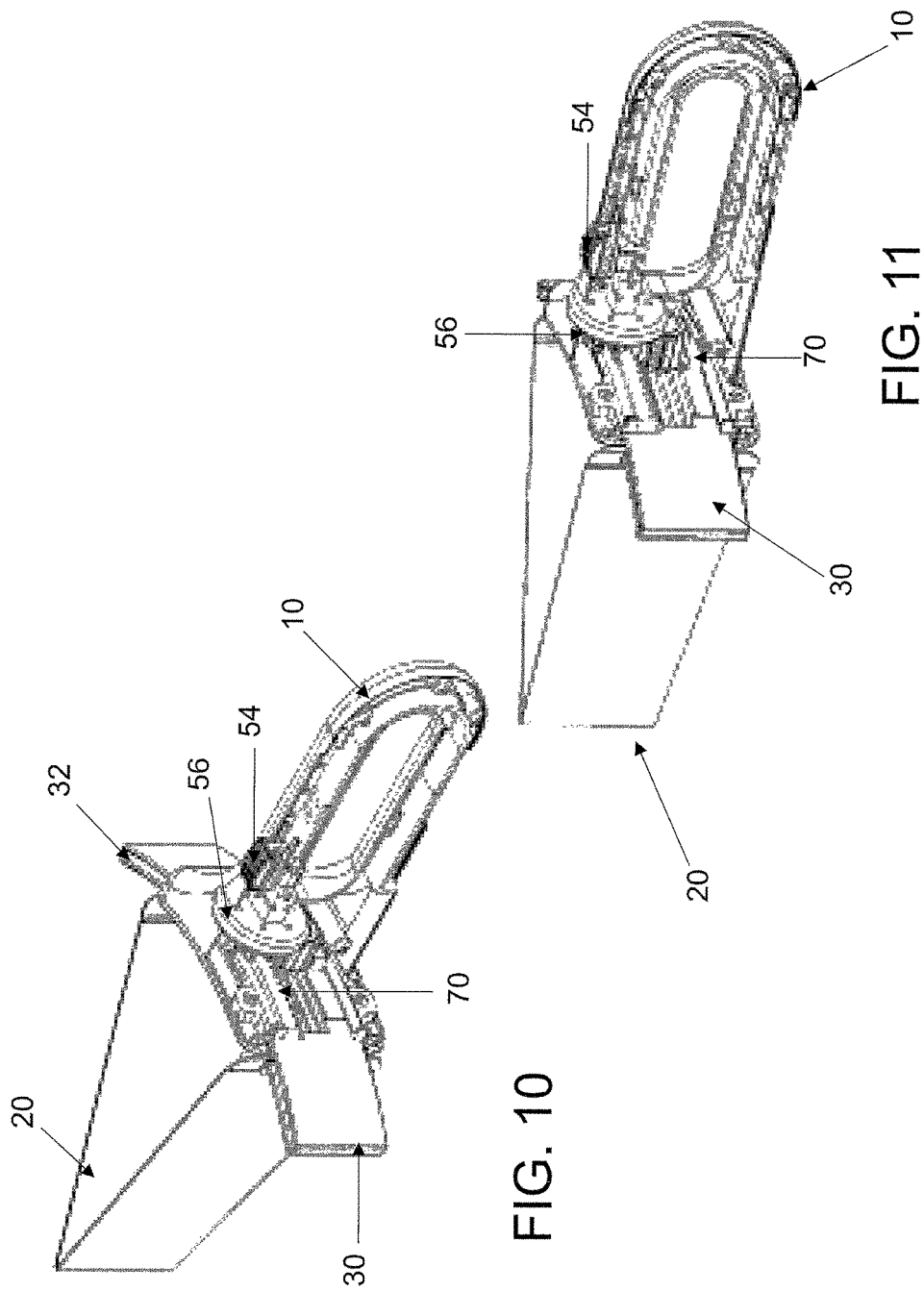

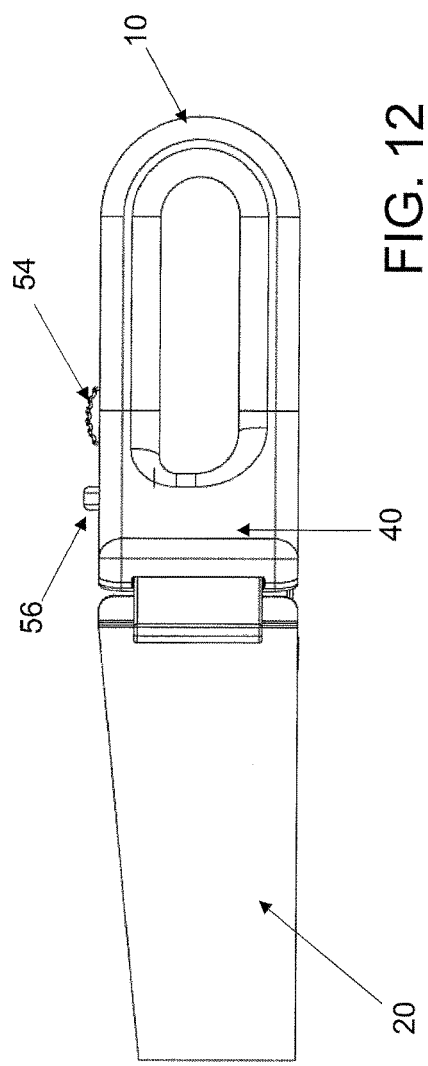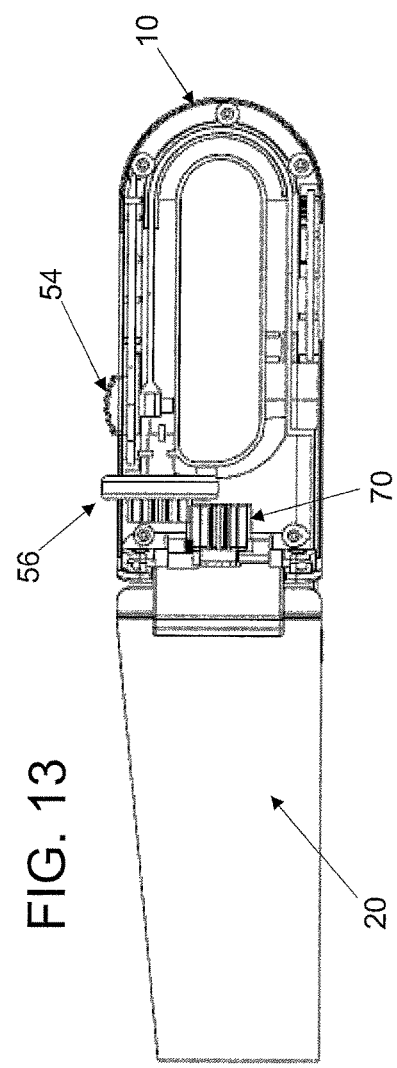

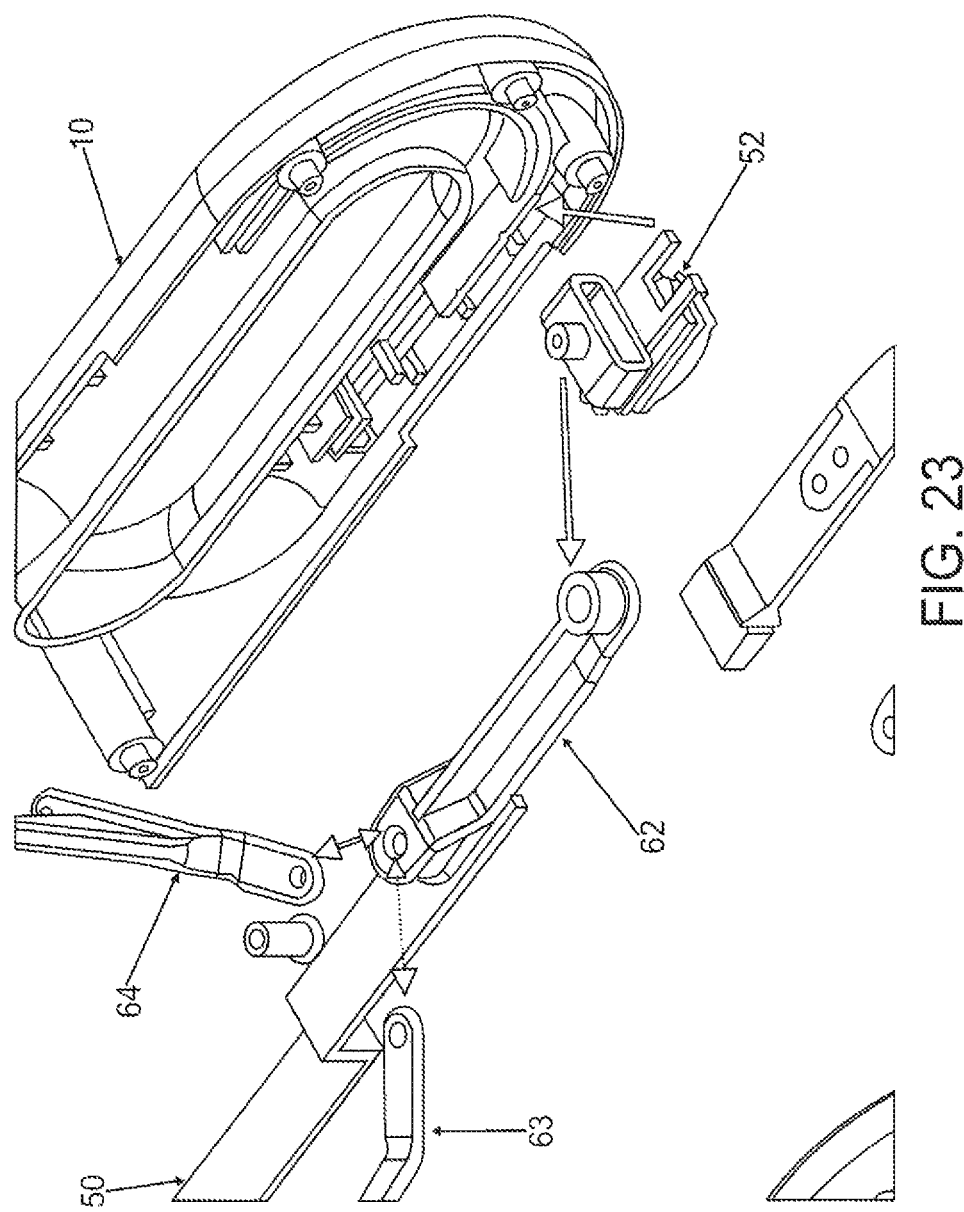

DEVICE FOR CUTTING SLICES OF A FOOD PRODUCT

FIELD OF THE INVENTION

The invention relates to cutting devices and more particularly to a device for cutting in a single step and precisely slices of a cake, tart, pie, gelatin or similar food product and at the same time to remove the cut slice from the rest of the cake or food product easily and simply and place hygienically and safely said cut slice where desired.

BACKGROUND OF THE INVENTION

The Chinese Patent CN 202311039 describes a device for cutting a cake, which consists of an device comprising: a) a triangular shaped piece (2) having extensions (1, 3), separate and parallel to each other, that constitute the handle for gripping said device to cut the cake, and b) an element (4) interconnecting said extensions and which serves to reduce or increase the size of the slice of cake to be cut.

The Hungary Patent HU0303233A2 describes a device which consists of a triangular configuration formed by straight sheets (1, 2) and a curved fluted sheet (3), wherein the sheets are hingedly connected at a vertex (10). As observed, the device proposes a system for modifying the size of the slice, so that one of the sheets can be opened or closed by sliding along the fluted sheet.

The Taiwanese Patent TW411117U describes a device for cutting a cake consisting of two main elements: a) a "V" member (110); b) a supporting structure (120) having a handle or grip (122) and a slightly curved section which presents slots (1231, 1241) on each side of a vertical shaft in which the ends of the work piece are inserted into said "V" member to form together the device and at the same time to define the size of the slice to be cut.

The U.S. Pat. No. 2,600,646 describes a device for cutting a cake consisting of an attachment formed by a "V" cutting section comprising some blades (1, 2) and respective handles (7) fastened to the ends of the cutting blades. The desired size of the slice is determined manually by simply approaching or separating the sheets (1, 2).

The U.S. Pat. No. 3,888,001 describes an adjustable device for cutting cakes consisting of two blades (3, 4) connected to a pin (5) and a graduated rule (10) along which a blade slides to a position where it is set by means of an element (8) to vary the angular relationship of the blades and therefore the size of the slice to be cut. The device also includes a handle (1, 2) for each blade.

The U.S. Pat. No. 4,411,066 describes a more complex device for cutting cakes, comprising a cutting blade (12) releasably fastened to a housing (24) containing a rack and pinion mechanism (42, 44), and that in combination with a plate and a helical screw determine the length and width of the piece of cake to be cut. The device also comprises a gripping element (60, 62, 64) serving as a handle for manipulating and actuating the various components.

The U.S. Pat. No. 4,553,325, of the same author as above, also describes a similar device for cutting a cake with some variants as how to activate the cutting blade (90) through a triggering means (40). For this, the device also includes a handle or grip (12) and rack and pinion mechanism (36, 38).

Besides the above, other patent documents such as U.S. Pat. No. 4,847,998, U.S. Pat. No. 4,592,139, U.S. Pat. No. 7,913,396 also describe alternative devices for cutting cakes, each with a specific technical proposal.

Despite the wide range of devices for cutting cakes, as will be deducted from the following description, the new device of the present invention has innovative features that stand out for their practicality and functionality compared with those of the previous proposals.

SUMMARY OF THE INVENTION

It is a principal object of the present invention to propose a new device for cutting cakes, tarts, jellies, pies or similar food products usually, but not necessarily, circular in shape, which is characterized by incorporating elements for adjusting the size of the slice of cake to be cut.

It is another object of the present invention to propose a new device for cutting cakes, tarts, jellies, pies or similar food products, which allows selecting in advance the amount of desired slices of cake before start cutting this latter depending on the size of slice or the number of diners.

It is another object of the invention to propose a new device for cutting cakes, tarts, jellies, pies or similar food products, which comprises means (clamping system) for cutting a slice of cake or similar food product and putting it away from said cake to place said slice wherever wished, without the slice falling off.

It is another object of the invention to propose a new device for cutting cakes, tarts, jellies, pies, or a similar food products, which has the peculiarity that his cutting section can be configured in different shapes so that the cake slice to be cut results in an original shape, different from a traditional slice.

In a preferred embodiment of the invention, the device for cutting slices of a food product such as a cake, tart, jelly, pie or the like, comprises: a grip or handle to hold and manipulate the device; a cutting blade structure connected to the handle, which structure is in the form of the slice or piece of the product to be cut; and an adjustable system configured to set the size of the slice. The system that defines the size of the slice is a mechanism connected to the blades of the cutting structure and adapted to cause said blades to move closer to and away from each other to decrease and increase, respectively, the angle formed at the vertex wherein both blades are joined, thereby defining the size of the slice of cake or food product. In addition, the device includes a mechanism for controlling the fastening and release of the slice of cake.

BRIEF DESCRIPTION OF THE FIGURES

FIG. 1 is a perspective view of a first embodiment of the cake cutting device of the present invention, wherein the operating mechanism for opening and closing the blades is of the sliding type.

FIG. 2 is another perspective view of the cake cutting device of the previous figure.

FIG. 8 is a perspective view of a second embodiment of the device for cutting cakes of the present invention, wherein the operating mechanism for opening and closing the blades is a gear-type mechanism.

FIG. 9 is another perspective view of the device of the previous figure, shown from another angle.

FIG. 10 is another perspective view of the device in which the housing and the handle are partially sectioned to allow us to see the actuating mechanisms of the system defining the size of the slice to be cut and also that actuating the retractable element.

FIG. 11 is another perspective view of the device in which the housing and the handle are partially shown uncovered.

FIG. 12 is a side view of the second embodiment of the device for cutting cakes.

FIG. 13 is a side view of the second embodiment of the device for cutting cakes, partially sectioned to show the interior of the housing and handle.

FIG. 23 is a detailed view of the sliding-type actuating mechanism of the system for opening and closing the blades of the device represented in the previous figure.

DETAILED DESCRIPTION OF THE PREFERRED EMBODIMENTS OF THE INVENTION

Figure 3:
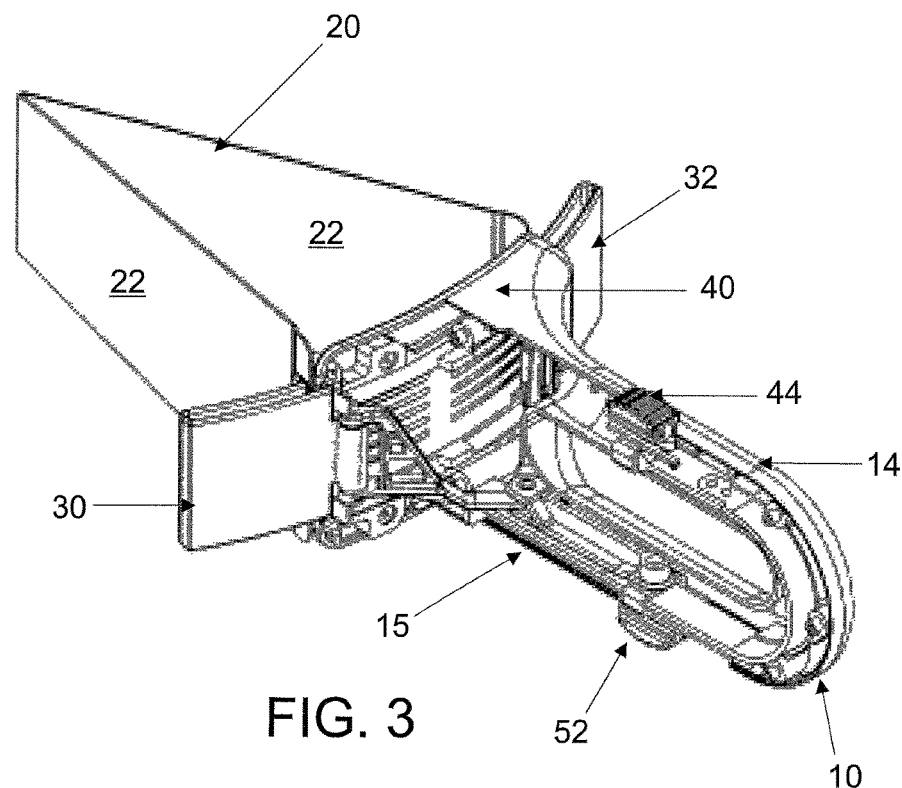
FIG. 3 is a rear perspective view of the device in which the housing and handle thereof are partially sectioned to allow us to see the actuating mechanisms both of the system defining the size of the slice of the food product to be cut and the retractable element.
Figure 4:
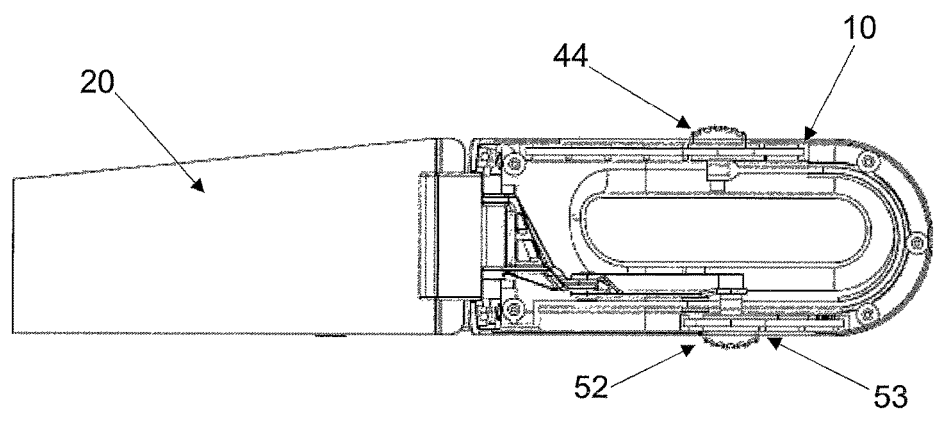
FIG. 4 is a side view of the device showing the handle and the housing longitudinally sectioned to observe the mechanism that regulates the size of the piece of cake and also that actuating the retractable element.
Figure 5:
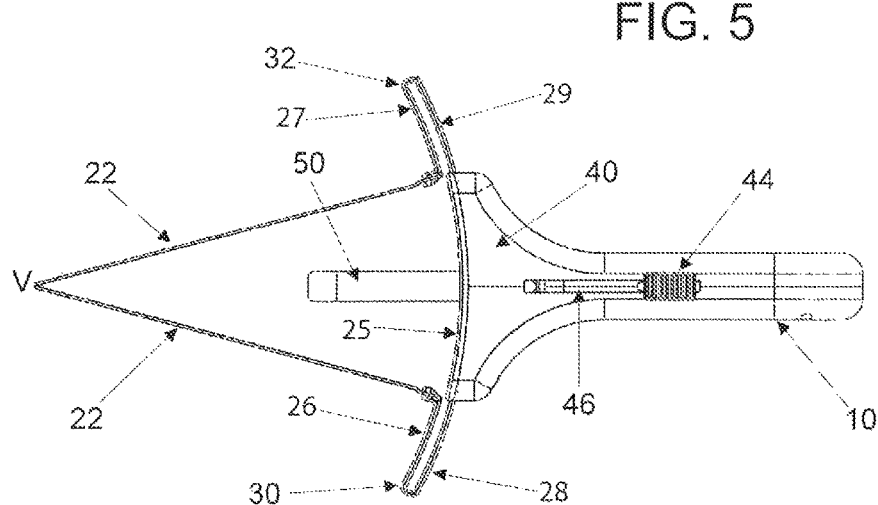
FIG. 5 is a top view of the device in which the retractable element is shown in an extended position outside the housing.
Figure 6:
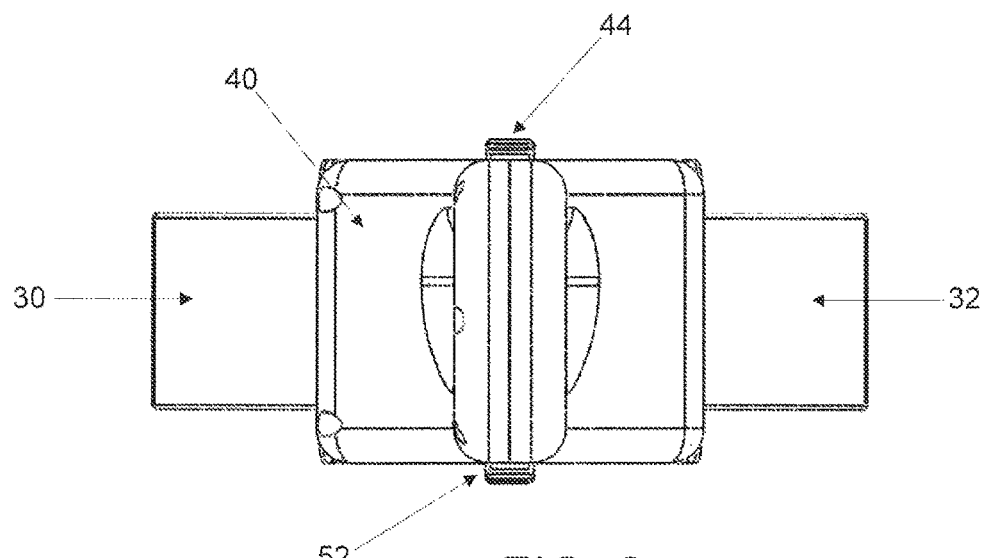
FIG. 6 is a rear view of the cake cutting device of the present invention.
Figure 7:
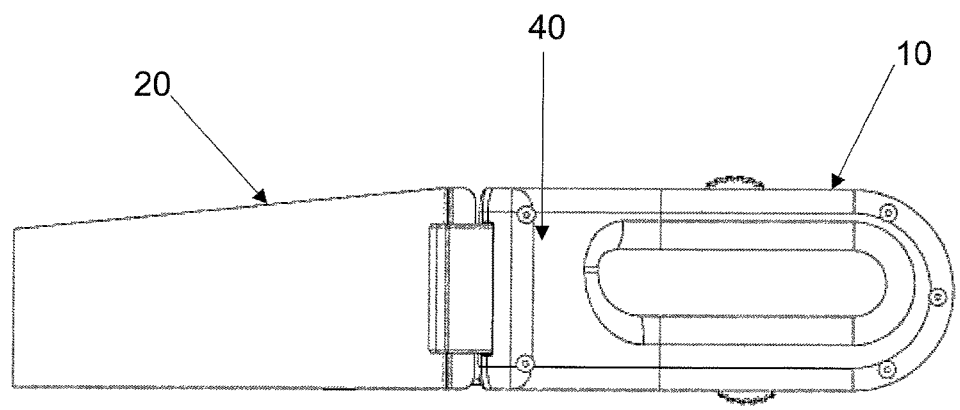
FIG. 7 is a side view of the cake cutting device of the present invention.
Figure 14:
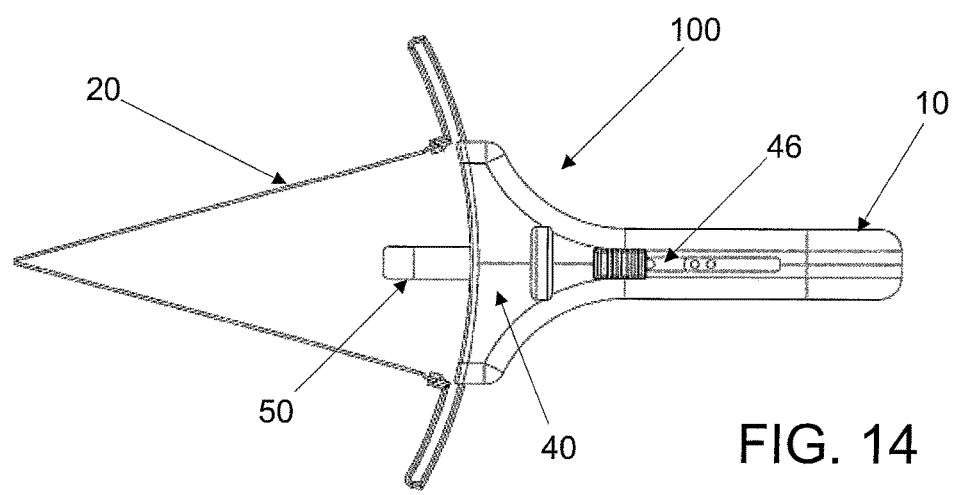
FIG. 14 is a top view of the device in which the retractable element is shown in an extended position outside the housing.
Figure 15:
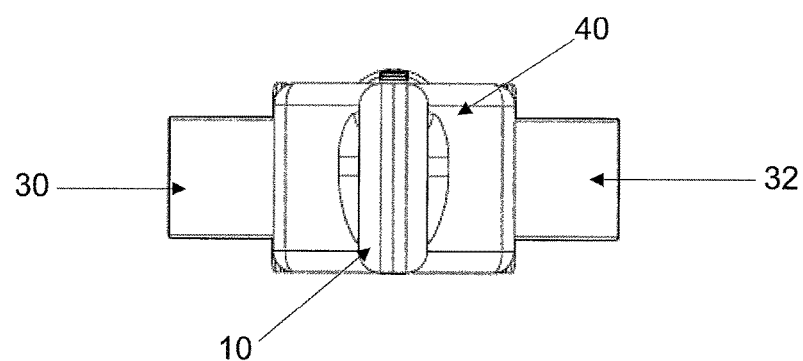
FIG. 15 is a rear view of the cake cutting device of the second embodiment.
Figure 16:
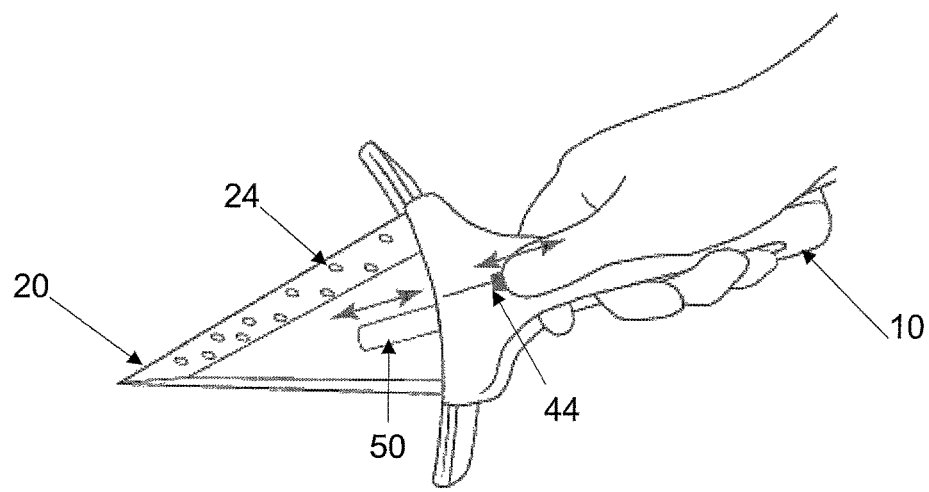
FIG. 16 is a perspective view showing the operation of the retractable element of the device of the first embodiment.
Figure 17:
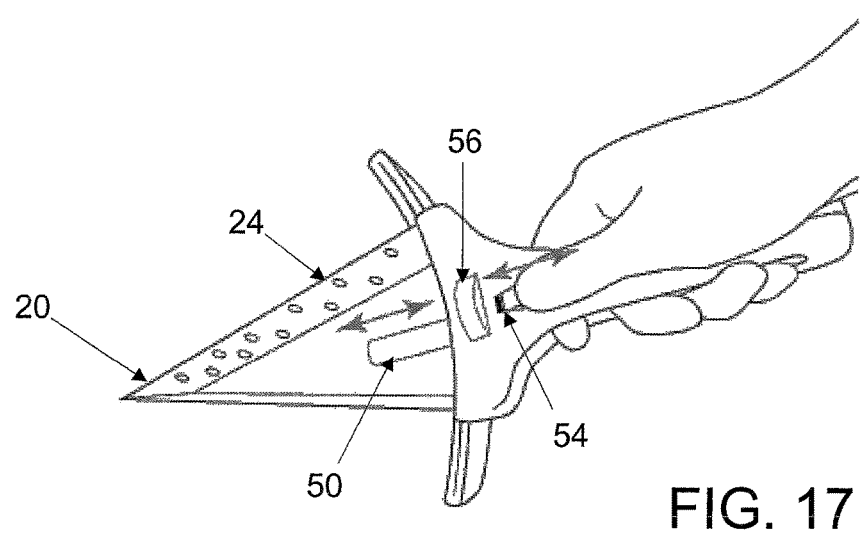
FIG. 17 is a perspective view showing the operation of the retractable element of the device of the second embodiment.
Figure 18:
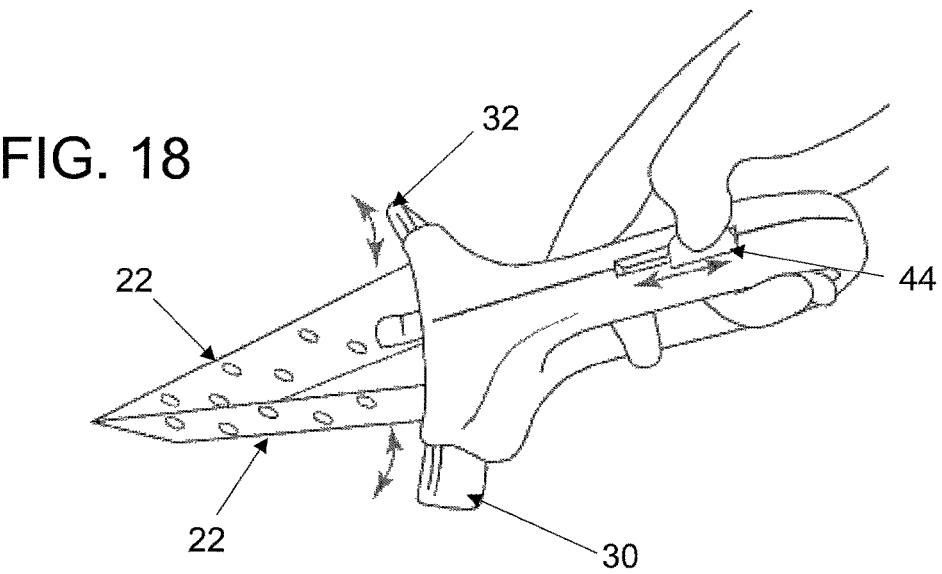
FIG. 18 is a perspective view showing the actuation of the opening and closing of the cutting blades in the device of the first embodiment to define the size of the slice of cake to be cut.
Figure 19:
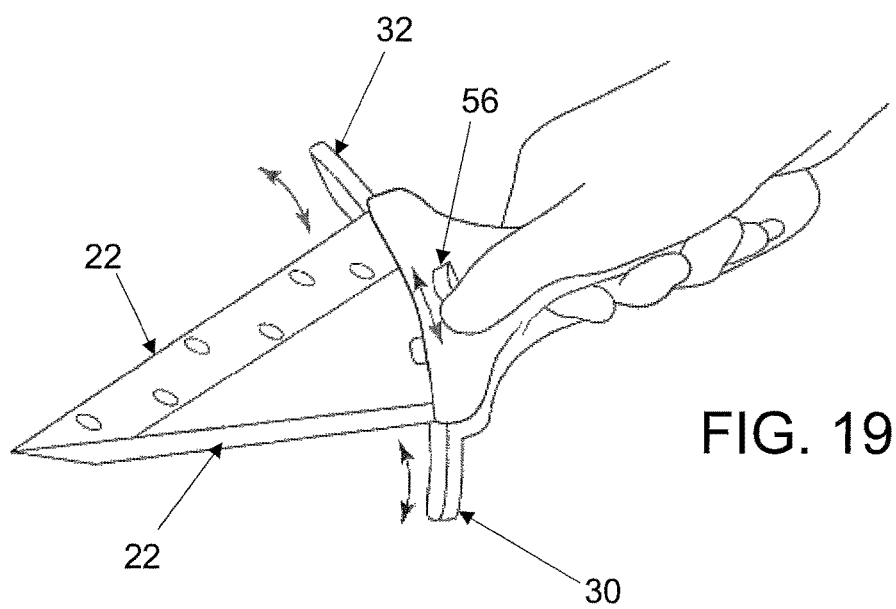
FIG. 19 is a perspective view showing the actuation of the opening and closing of the cutting blades in the device of the second embodiment to define the size of the slice of cake to be cut.

In the context of the present invention, the expression "device for cutting a food product" as a cake, tart, pie, jelly or the like, comprises any device that has the necessary elements for cutting the product into pieces or slices in shapes that can encompass the traditional triangular slices until other feasible shapes, for example, square, circular or adopting other fanciful shapes, e.g., other geometric and animal figures, fictional characters, etc.

In a first embodiment of the invention, which is illustrated by way of example in FIGS. 1 to 7, 22 and 23, the device (100) for cutting cakes comprises a grip or handle (10) to hold and manipulate the device; a housing (40) adjacent to the grip in which the actuation mechanisms of the device are housed; and a cutting section (20) operatively connected to the above elements.

The handle (10) of the device has upper and lower gripping sections (14, 15) conforming a space in which the user fingers can be inserted, except for the thumb that is commonly used to operate the mechanisms of the system that defines the size of the slice to be cut and an element (50) adapted to support a slice of cake previously cut.

The cutting section (20) of the device (100) comprises a cutting sheet structure formed by blades (22), which takes the shape of a slice or piece of the product to be cut, as shown in the accompanying exemplary figures, or any other shape as desired. To cut the slice of the cake, it is only necessary to place the cutting section (20) of the device on the cake and press gently on it so that the blades (22) are inserted into the food product until said blades reach the cake supporting base.

The device (100) also comprises a system for defining the size of the slice to be cut and means for defining in advance the amount of slices desired to obtain from the cake. The system defining the size of the slice comprises side projections (30, 32), one end of which is connected with one end of a corresponding blade (22) and the other end is inserted into the housing (40) in a predetermined length by the way of a lateral sliding movement outwardly and inwardly of said housing (40), thereby defining the amplitude of the angle formed at the vertex (V) and thus the size of the slice of cake. The housing (40) has a concave forward wall (25). The left side lateral projection (30) has a curved front wall (26) and a curved rear wall (28) with a slot formed therebetween. The right side lateral projection (32) has a curved front wall (27) and a curved rear wall (29) with a slot formed therebetween. The opening and closing movement of the blades is controlled by an actuating means (44, 56) protruding from the grip portion (14) of the handle, which is operatively connected with a mechanism lodged in the housing (40) and the handle (10), which in turn is connected to the lateral sliding projections (30, 32). In this way, by actuating the means (44, 56) by the thumb of the hand, the blades (22) come close or move away from each other to decrease and increase, respectively, the angle formed at the vertex (V) wherein both blades (22) are connected, thereby defining the size of the slice of cake to be cut.

In one embodiment of the device, the system for opening and closing the blades may comprise a sliding-type actuating mechanism (60) (FIGS. 1 to 7, 22 and 23). In another alternate embodiment, the system for opening and closing may comprise a gear-type actuating mechanism (70) (FIGS. 8 to 15, 20 and 21). Although the above specific actuating mechanisms are described in the specification, a person having ordinary skill in the art may deduct that other variants can be implemented for the same purposes without departing from the inventive concept disclosed herein.

Figure 20:
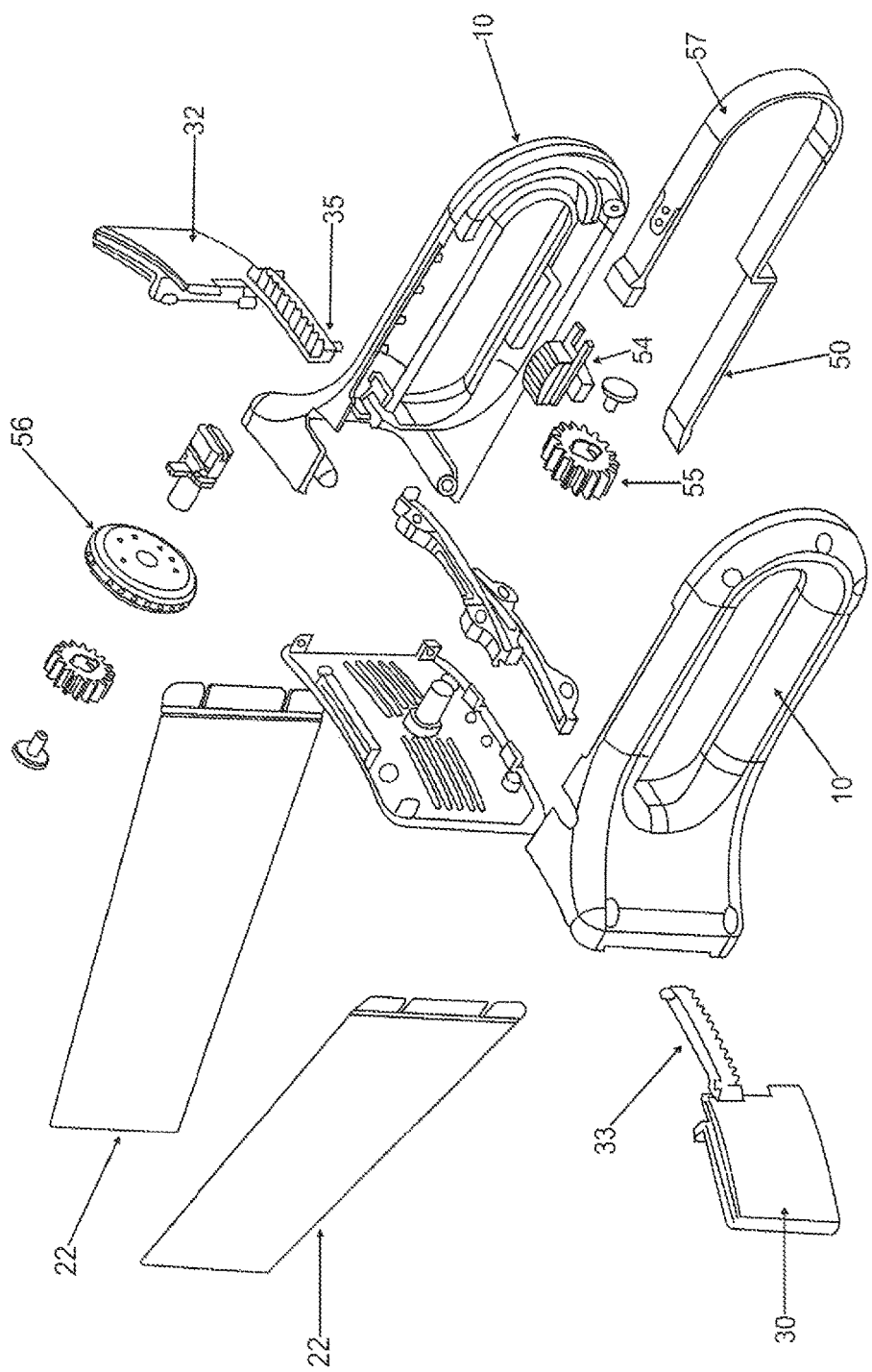
FIG. 20 is an exploded view of the device of the second embodiment that allows visualizing the components of the actuating mechanisms lodged in the housing and handle.

According to FIG. 20, in which the device (100) is shown in an exploded condition, it can be seen all of the various elements of the gear-type actuating mechanism of the system for opening and closing the blades and the fastening mechanism lodged in the housing (40) and the handle (10). As shown, each side projection (30, 32) include a toothed extension (33, 35) which jointly define a toothed section, which when rotating a gear (55) connected to the actuating element (56) of the opening and closing system causes the extensions (33, 35) to move closer to or away from each other, thereby opening or closing the blades of the cutting section to change the size of the slice to be cut.

Figure 21:
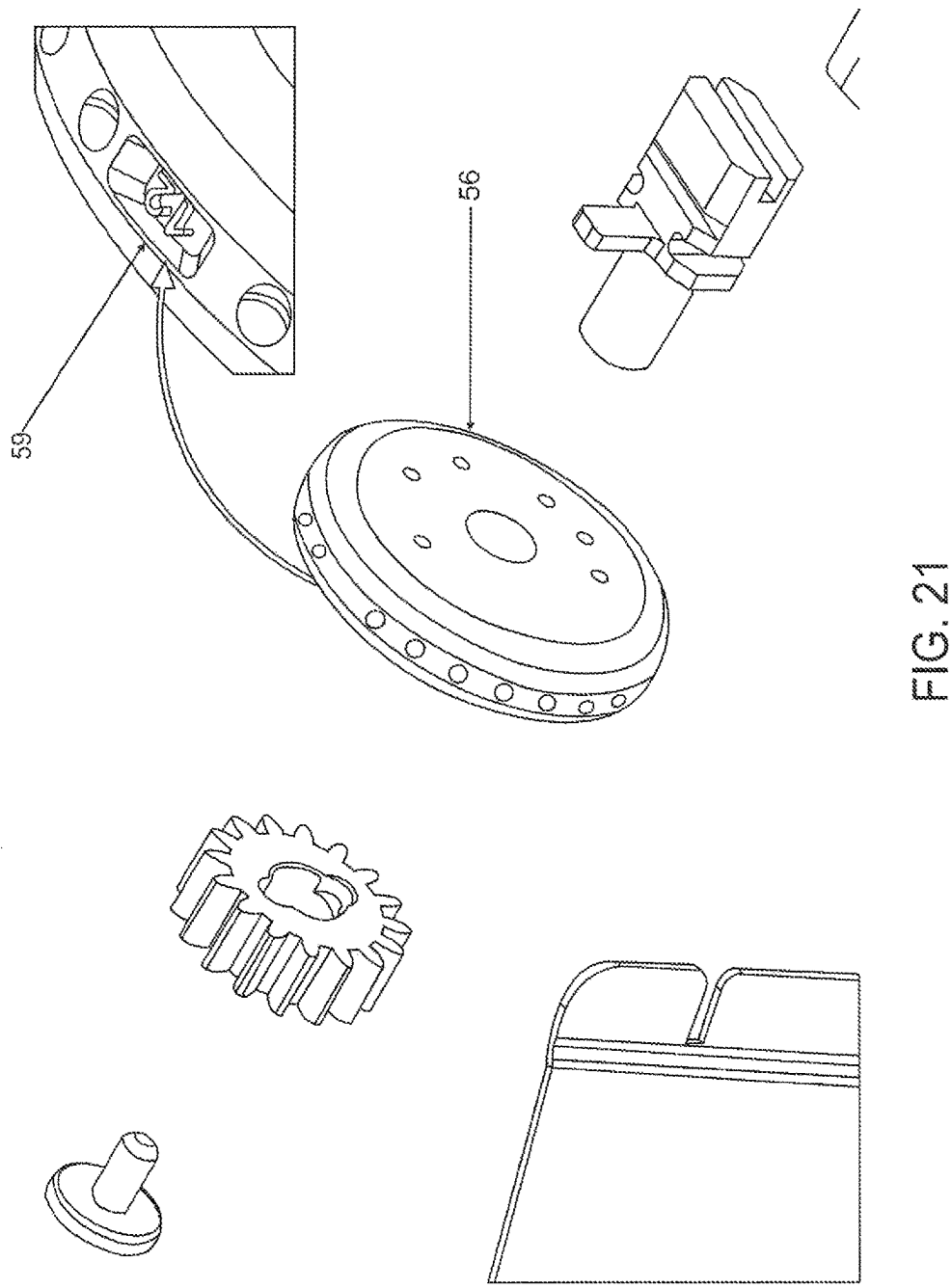
FIG. 21 is a detailed view of the actuating element of the system for opening and closing the blades of the device represented in the previous figure.

The detailed view of FIG. 21 shows that the actuating element (56), which is proposed as a rotating disk in the second embodiment, includes on its periphery (59) some marks indicating the amount of slices to be obtained when selecting a particular position of said element.

Figure 22:
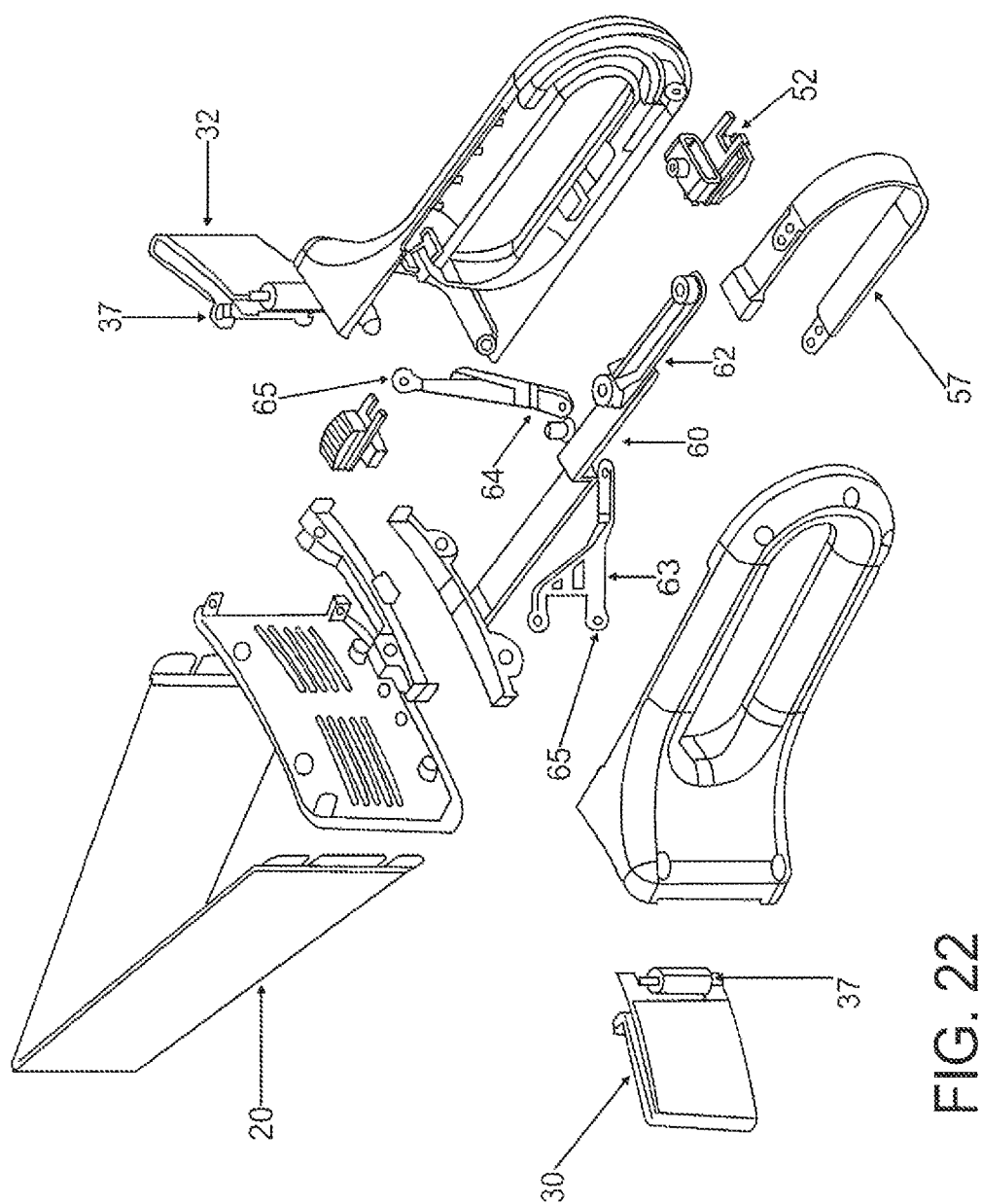
FIG. 22 is an exploded view of the device of the first embodiment to allow us to observe the components of the actuating mechanisms lodged in the housing and handle.

Meanwhile, FIG. 22 shows the device of the first embodiment in an exploded condition, wherein the system for opening and closing the blades functions using a sliding mechanism (60). The mechanism (60) comprises a connecting member (62) attached to the actuating element (52) so that the sliding displacement of said element (52) along the groove (53) in the handle (10) moves the member (62) rectilinearly at a distance and direction (forward or backward) determined by the range and direction of said sliding element (52). To transfer this movement to the blades (22), one end of the arms (63, 64) is connected to the member (62), while the other arm end is connected to the lateral projections (30, 32) by any appropriate means, such as the exemplary elements (65, 37) illustrated in this figure. Since the projections (30, 32) are connected with the blades (22), their opening or closing movement to define the size of the slice is caused by the forward or backward movement of the member (62), which is driven by the actuating element (52) as mentioned above.

The enlarged view of FIG. 23 allows us to observe in detail the elements of the sliding mechanism (60) of this embodiment and also some marks to be used as a guide to select the position of the actuating element (52) depending on the amount of slices desired to be obtained from the cake.

Another important feature of the invention is a means (50) for holding and releasing a freshly cut slice of cake. In an embodiment, said holding means may consist of a retractable extension (50) which is the end portion of a sheet piece (57) housed within the housing (40) and the handle (10). The extension (50) can be projected out of the housing (forward) by operating an actuating means (54) in the grip section (15) of the handle, which is connected with said piece (57), in the case of the first embodiment, and with means (52) in the grip section (14) of the handle in the case of the second embodiment. The outward movement of the retractable extension (50) occurs after the device has cut one slice from the cake, thereby serving the extension under the slice as a support when the device is manipulated to remove the slice from the cake. Afterwards, the extension (50) retracts again by operating the activating means (52) for depositing (releasing) the slice where desired.

Preferably, but not necessarily, blades (22) may include orifices (24), circular or in various geometrical shapes, to facilitate the slice can easily be released when delivered. Also, the blade cutting edge making contact with the cake or food product may be a straight or wavy or zigzag line to provide a different profile aesthetic slice.

Although the invention has been described in the context of the preferred embodiments, it will be evident to a person skilled in the art that the scope of the inventive concept described by way of example extends beyond the design or configuration specifically described and illustrated to other possible alternative forms of embodiment of the invention that may be deductible or derivable from the previously outlined principles. In this way, although the invention has been described in detail according to its preferred designs, it would be obvious that several elements of the device can be replaced by other similar or different elements in the light of the foregoing description without implying that the essence or nature of the claimed invention is modified.

Accordingly, it may be understood that various elements of the device can be incorporated or combined with others or replaced by others to conform alternate embodiments leading to the same result. Therefore, it is intended that the scope of protection of the present invention is not interpreted based only on the embodiments described above but rather by a reasonable interpretation of the content of the following claims.

The best mode to carry put the invention is that described in this document.

What is claimed is:

1. A device for cutting slices of a food product, which comprises a handle to hold and manipulate said device; a structure of cutting blades in the form of the slice or piece to be cut; a housing between the cutting blades and said handle; a system for opening and closing the blades to define the size of the slice of the food product; and means for holding and releasing a freshly cut slice of the food product: wherein:
   said system for opening and closing said blades comprises lateral projections arranged at the sides of the housing, one end of said projections being connected to said blades and the other end of said projections adapted to be selectively inserted into said housing; said projections are adapted to slide laterally selectively; an actuating mechanism operatively connected to said side projections to jointly cause the blades to move, closer to or away from each other to thereby define the size of the slice of food product to be cut; and an element for actuating said system for opening and closing the blades, which is disposed in the handle to select the size of the slice of the food product and release the freshly cut slice; and
   said means for holding and releasing the freshly cut slice comprising, a retractable element which, when unactuated, is lodged within said housing and said handle, and an actuating element in the handle operatively connected to said retractable element to cause the retractable element to first extend outside the housing under the freshly cut slice of food product for holding said slice when removed from the food product, and then inwardly of the housing when the slice will be served.

2. The cutting device of claim 1, wherein the actuating mechanism of the opening and closing system comprises a sliding-type mechanism.

3. The cutting device of claim 1, wherein the actuating mechanism of the opening and closing system comprises a gear-type mechanism.

4. The cutting device of claim 1, further including grooves along which the actuating element of the opening and closing system and the actuating element of the retractable demerit move when actuated.

5. The cutting device of claim 1, wherein the actuating element of the opening and closing system includes means for selecting in advance the amount of slices desired to obtain food product.

6. The cutting device of claim 1, wherein the positioning of the actuating element of the opening and closing system determines the amount of slices to be cut.

7. The cutting device of claim 1, wherein the retractable element is retracted into the housing, when the slice will be served.

8. The cutting device of claim 1, further comprising marks for indicating the amount of slices into which the food product is to be split.

9. The cutting device of claim 1, further including orifices in the blades to facilitate the release of the freshly cut slice of food product.

10. The cutting device of claim 1, wherein the blades are straight or wavy or zigzag to cut a different profile slice.

* * * * *

UNITED STATES PATENT AND TRADEMARK OFFICE
CERTIFICATE OF CORRECTION

PATENT NO. : 10,085,456 B2
APPLICATION NO. : 14/468697
DATED : October 2, 2018
INVENTOR(S) : Miguel Angel Avila Macias Page 1 of 1

It is certified that error appears in the above-identified patent and that said Letters Patent is hereby corrected as shown below:

In the Claims

Claim 1, Column 6, Line 25: Replace "move, closer" with "move closer"

Claim 1, Column 6, Line 33: Replace "comprising. a" with "comprising a"

Claim 4, Column 6, Line 51: Replace "demerit" with "element"

Signed and Sealed this
Sixth Day of November, 2018

Andrei Iancu
*Director of the United States Patent and Trademark Office*